United States Patent
Saadallah

(10) Patent No.: US 12,345,828 B2
(45) Date of Patent: *Jul. 1, 2025

(54) METHODS AND SYSTEMS FOR LOW POWER WIDE AREA NETWORK LOCALIZATION

(71) Applicant: Swisscom AG, Bern (CH)

(72) Inventor: Ahmed Saadallah, Bern (CH)

(73) Assignee: Swisscom AG, Bern (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,875

(22) Filed: Oct. 9, 2023

(65) Prior Publication Data
US 2024/0111013 A1    Apr. 4, 2024

Related U.S. Application Data

(63) Continuation of application No. 16/926,013, filed on Jul. 10, 2020, now Pat. No. 11,782,120.

(30) Foreign Application Priority Data

Jul. 10, 2019  (EP) .................................. 19185557

(51) Int. Cl.
*G06N 3/063*    (2023.01)
*G01S 5/02*     (2010.01)
(Continued)

(52) U.S. Cl.
CPC .............. *G01S 5/02* (2013.01); *G06F 18/214* (2023.01); *G06N 3/044* (2023.01); *G06N 3/063* (2013.01); *H04W 52/0245* (2013.01)

(58) Field of Classification Search
CPC . H04W 52/02; H04W 52/0245; G06F 18/214; G06N 3/044; G06N 3/063; G06N 3/04; G01S 5/02

See application file for complete search history.

(56) References Cited

U.S. PATENT DOCUMENTS

2019/0120925 A1*  4/2019  Lohbihler ............... G01S 11/14

FOREIGN PATENT DOCUMENTS

| CN | 107396322 | | 11/2017 | |
|---|---|---|---|---|
| CN | 108459298 | * | 8/2018 | ............... G06K 9/62 |

OTHER PUBLICATIONS

Extended European Search Report for EP19185557.6, dated Jan. 28, 2020, 11 pages.

(Continued)

*Primary Examiner* — Tuan H Nguyen

(74) *Attorney, Agent, or Firm* — McAndrews, Held & Malloy, Ltd.

(57) ABSTRACT

Methods and systems are provided for low power wide area network localization. A location of a mobile device communicating with one or more gateways of a long-range low-power wide-area network (LoRaWAN), having known locations, may be determined, using a model configured for accepting input values relating to a signal strength measure (RSS) of electromagnetic signals transmitted, continuously or intermittently, between the mobile device and the one or gateways of the LoRaWAN having known locations. The signals may be collected and evaluated as the mobile device is moving across a reception area of the LoRaWAN, to derive values representative of the signal strength measure (RSS), to feed as input signal(s) to the model. The model is used to generate values representative of the location of the mobile device and a location dependent measure of uncertainty in each location.

18 Claims, 6 Drawing Sheets

(51) Int. Cl.
    *G06F 18/214*     (2023.01)
    *G06N 3/044*     (2023.01)
    *H04W 52/02*     (2009.01)

(56) References Cited

OTHER PUBLICATIONS

"Indoor Geolocation with Received Signal Strength Fingerprinting Technique and Neural Networks", Nerguizian, et al., 11th International Conference on Telecommunications, Fortaleza, Brazil, Aug. 1-6, 2004, 10 pages.

"Indoor Localization Using Neural Networks with Location Fingerprints", Laoudias, et al., International Conference on Financial Cryptography and Data Security; Sep. 14, 2009, 10 pages.

"LoRaLoc: Machine Learning-Based Fingerprinting for Outdoor Geolocation Using LoRa", 6th Swiss Conference on Data Science, IEEE, Jun. 14, 2019, 6 pages.

"Non-Line-of-Sight Identification and Mitigation Using Received Signal Strength", Xiao Zhuoling, et al., IEEE Transactions on Wireless Communications, IEEE Service Center, vol. 14, No. 3, Mar. 1, 2015, 14 pages.

\* cited by examiner

```
┌─────────────────────────────────────────────────┐
│ Providing a model capable of accepting input    │
│ values relating to a signal strength measure    │
│ (RSS, RSSI) of electromagnetic signals          │
│ transmitted between a mobile device to be       │
│ localized or tracked and one or gateways of     │
│ the low-power wide-area network (LoRaWAN)       │
└─────────────────────────────────────────────────┘
                         │  ⌐ 10
┌─────────────────────────────────────────────────┐
│ Moving the mobile device across the reception   │
│ area of the low-power wide-area network         │
│ (LoRaWAN) while either continuously or          │
│ intermittently transmitting signals to the one  │
│ or more gateways                                │
└─────────────────────────────────────────────────┘
                         │  ⌐ 20
┌─────────────────────────────────────────────────┐
│ Collecting and evaluating the signals received  │
│ by the gateways to derive values representative │
│ of the signal strength measure (RSS; RSSI) as   │
│ required as input to the model                  │
└─────────────────────────────────────────────────┘
                         │  ⌐ 30
┌─────────────────────────────────────────────────┐
│ Using the values as input to the model          │
└─────────────────────────────────────────────────┘
                         │  ⌐ 40
┌─────────────────────────────────────────────────┐
│ Using the model to generate values              │
│ representative of the location of the mobile    │
│ device and to make available the generated      │
│ location values together with a location        │
│ dependent measure of uncertainty in the         │
│ location                                        │
└─────────────────────────────────────────────────┘
                                            ⌐ 50
```

Fig. 1

METHODS AND SYSTEMS FOR LOW POWER WIDE AREA NETWORK LOCALIZATION

CLAIM OF PRIORITY

This patent application is a continuation of U.S. patent application Ser. No. 16/926,013, filed on Jul. 10, 2020, now issued U.S. Pat. No. 11,782,120, which in turn claims benefit of the filing date of, and right of priority to European (EP) Patent Application Serial No. 19185557 filed Jul. 10, 2019. Each of the above identified applications is hereby incorporated herein by reference in its entirety.

TECHNICAL FIELD

The present disclosure relates to communication solutions. In particular, various embodiments in accordance with the present disclosure relate to methods and systems for low power wide area network localization.

BACKGROUND

Conventional solutions, if any existed, for location determination that may be used with low power communication devices and related communication protocols may be costly, cumbersome and inefficient. Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

Systems and/or methods are provided for low power wide area network localization, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Various features and advantages of the disclosure will become apparent from the following description of non-limiting exemplary embodiments, with reference to the appended drawings, in which:

FIG. 1 illustrates an example sequence of steps for low power wide area network localization, in accordance with the present disclosure.

DETAILED DESCRIPTION

Figure 2A:
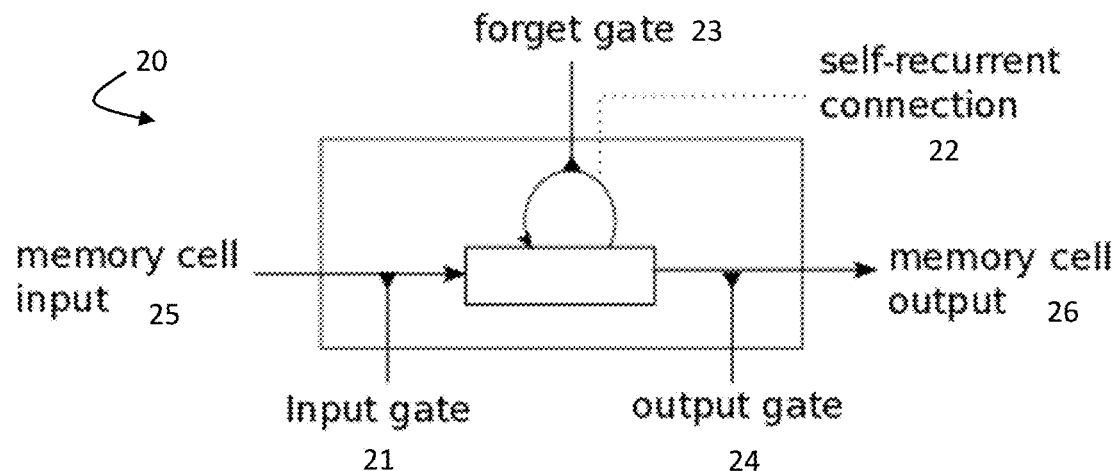
FIGS. 2A and 2B illustrate an example architecture of a multistage LSTM neural network, in accordance with the present disclosure.

As utilized herein the terms "circuits" and "circuitry" refer to physical electronic components (e.g., hardware), and any software and/or firmware ("code") that may configure the hardware, be executed by the hardware, and or otherwise be associated with the hardware. As utilized herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Example implementations in accordance with the present disclosure may be found in systems and methods for low power wide area network localization, as described below in more detail with reference to the attached figures. In this regard, wide area localization typically may be based on satellite positioning (e.g., Global Positioning System (GPS)) based techniques or on cellular (e.g., Global System for Mobile Communications (GSM)) infrastructure. Both types of localization methods may be regarded as complex and power intensive, however, requiring high investments to set up the underlying systems whilst individual receivers for both techniques rapidly drain the available power sources for mobile devices. These existing problems become even more relevant for low-powered mobile devices, such as in the currently emerging Internet of Things (IoT) infrastructures.

An IoT infrastructure may be characterized as including a low-power, low-bandwidth wide area network such as a Long-range Wide Area Network (LoRaWAN) made up of mainly stationary access points or gateways, capable of providing communication channels to a multitude of low-power, low-bandwidth mobile or immobile devices. These devices are typically produced at a fraction of the costs of GPS or GSM devices, and with very limited power resources or batteries. With respect to applications of IoT, location tracking is considered an important field of use, allowing for, e.g., determining location of materials and devices on a campus or larger industrial sites or to track deliveries in a neighborhood or within larger buildings. LoRa networks currently use (license-free) sub-gigahertz radio frequency bands, e.g., in the range of 150 MHz to 1 GHz, like the 169 MHz, 433 MHz, 868 MHz (Europe) and 915 MHz (North America) frequency bands. The typical data rates are in the range of 10 bps to 100 kbps.

The LoRaWAN™ protocol provides basically two methods for geolocation determination: Received Signal Strength (RSS) based techniques, for coarse location determination, or Time Difference Of Arrival (TDOA), for finer accuracy with the latter typically achieving an accuracy of 20 m to 200 m depending on the existing infrastructure, e.g., the density of gateways, obstacles etc. In TDOA, several gateways simultaneously receive the same uplink message, and the end-device location is determined using multilateration techniques.

To achieve higher accuracy, a fingerprint classification of LoRa signals may be used. In this regard, compared to the known fingerprinting-based methods using time-stamped signals, the received signal strength (RSS) based approach is considered to be one of the simplest approaches requiring little or no additional circuitry over and above the normal communication tasks of devices and gateways. The RSS is the actual signal power strength received at the receiver, usually measured in decibel-milliwatts (dBm) or milliWatts (mW). The RSS may be used to estimate the distance between a transmitter (Tx) and a receiver (Rx) device; the higher the RSS value the smaller the distance between Tx and Rx. The absolute distance may be estimated using several different signal propagation models given that the transmission power or the power at a reference point is known.

RSS based localization may require in one variant trilateration or N-point lateration, e.g., the RSS at the device is used to estimate the absolute distance between the user device and at least three reference points, such as the gateway locations; then basic geometry/trigonometry is applied for the user device to obtain its location relative to the reference points. In a similar manner, in a second variant the RSS at the reference points is used to obtain the location of the user device. In the latter case, a central controller or ad-hoc communication between reference points is needed for the total RSS collection and processing. While the RSS based approach is simple and cost efficient, it suffers from poor localization accuracy (especially in non-line of-sight conditions) due to additional signal attenuation resulting from transmission through walls and other big obstacles and severe RSS fluctuation due to multipath fading and indoor noise. Such problems require more sophisticated approaches.

The typical applications for a low power location determination are IoT applications based on small sensors/devices that are battery powered and operate over a limited space. One example application involves asset management requiring infrequent position updates where status and location of various assets, tracked goods, people and animals are monitored, or to otherwise locate parcels and orders. Small mobile LoRa nodes may be attached to different components in an assembly line to break down the time spent at each step. Some other examples include geo-fencing to detect the movement of a normally stationary object, which may be implemented in, for example, construction sites, utility yards, airports, campuses, etc., to protect against theft.

Solutions in accordance with the present disclosure overcome some of the issues with convention solutions (if any such conventional solutions even exist), thus providing methods and systems for improved but robust location or tracking determination using the communication and signals available in LoRaWAN networks.

FIG. 1 illustrates an example sequence of steps for low power wide area network localization, in accordance with the present disclosure. Shown in FIG. 1 a sequence (a plurality) of example steps, which may be performed in a suitable system (e.g., a data processing apparatus, as described above) to provide low power wide area network localization.

In step 10, a model for linking signal strength and locations may be built or provided, which may be capable of accepting input values relating to RSS, or relating to RSS and/or ESP, or relating to RSS and/or SNR, or a combination of RSS, ESP, and SNR, of electromagnetic signals transmitted between a mobile device to be localized or tracked and one or more access points or gateways of a low-power wide area network (LoRaWAN) with known locations.

In step 20, a mobile device may move across the reception area of the low-power wide area network while either continuously or intermittently transmitting or receiving signals to or from the one or more gateways.

In step 30, the signals may be evaluated to derive values representative of RSS, SNR or ESP, and as required as input to the model.

In step 40, the determined values, as described with respect to step 30, may be used as input to the model.

In step 50 the model generates values representative of the location of the mobile device and makes available the generated location values together with a location dependent measure of uncertainty in the location.

The RSS related signals typically may be measured in units such as dBm or relative units as in the various measures of the Received Signal Strength Indicator (RSSI), which represents a measurement of how well the receiver "hears" a signal from the transmitter. Another measurement that may be used is Signal-to-Noise Ratio (SNR), which is the ratio between the receiver power signal and the noise floor power level which is the sum of the powers of all unwanted interfering signal sources that may corrupt the transmitted signal. LoRa typically operates below the noise floor giving negative SNR values. Using RSS and SNR a combined value such as the Estimated Signal Power (ESP) may be calculated using for example the relation:

$$ESP = RSS - 10 \log(1 + 10 \exp[-SNR/10])$$

However, any other available measure representative of signal strength may be used to train the model and to determine a mobile device. It should however be noted that RSS related measurements are typically very badly correlated with the distance between the object and a stationary gateway. For that reason, RSS has so far not been considered for accurate location determination, e.g., with sub-100 m resolution. Using a method as proposed herein may improve the resolution even when using RSS.

The model as referred to in FIG. 1 may be built by evaluating the relevant inputs at known locations, e.g., by collecting a dataset with for example GPS coordinates. The difference between the coordinates as predicted by the model and the GPS coordinates ("the ground truth") is typically minimized to increase the accuracy of the model. In the case of neural networks this evaluation step is also known as "training". It is worth noting that among the many different modelling methods not all are equally efficient in solving the problem of converting the chosen input values into location values. It was found that a neural network of a class which accepts parallel inputs to influence the current output, such as Recurrent Neural Networks (RNN) are well suited to this problem. The parallel inputs, which in this case may be a subset of the accumulated temporal sequence of measurements as defined by a time-shifted window, are fed into a corresponding parallel architecture of network units or cells.

Further efficiency gain may be made by using the neural network to determine the value of a theoretically continuous parameter, e.g., a value for the x or y coordinates, as output instead of a probability of a class or classes, e.g., grid cells. This avoids having to split a wide area into a grid or other type of distinct location classes as is done in known methods using for example the correlation between a signal fingerprint of the received signal and a cell of a grid in fingerprinting-based approaches.

In some example implementations, the neural network used is a sequence-to-sequence RNN which uses a sequence as input and outputs a sequence. In particular, the model may include a combination of encoder and decoder where the encoder is a part of the network that takes the input sequence and maps it to an encoded representation of the sequence. The encoded representation, which depending on the type of network used may for example be the final hidden state of the trained network is then used by the decoder network to generate an output sequence.

In an example implementation, Long Short-Term Memory (LSTM) models are used. In this regard, while various different LSTM based model architectures may exist (e.g., "peephole" LSTM, "gated recurrent unit" (GRU), etc.), these models may still share common features, such as inclusion and use of layers of cells, each having a forget gate that controls how much of a previous input is retained for the calculation of the present output. A LSTM unit may be composed of a cell, an input gate to the cell, an output and a forget gate. The cell remembers values over arbitrary time intervals and the three gates are used to regulate the flow of information into and out of the cell, with particularly the forget gate being used to control how much of the input to a previous cell in a parallel architecture of cells or layer is preserved.

The LSTM or other neural networks may include a layer of parallel cells allowing for the simultaneous input of two or more position related signals the RSS. In this regard, a sufficient number of parallel cells (e.g., determined by any suitable means—such as experimentally, by analysis, etc.) may be used to apply a time window to the position related signal (e.g., between 3 to 15 consecutive samples). Thus, as a mobile device moves through the LoRaWAN area, a time sequence of position related signals may be generated and used. For example, the time window may be used in determining how many consecutive signals may be used as simultaneous inputs to the neural network. The window size may on the one hand be too large and consequently dilute the context and introduce noise in the prediction. On the other hand, a small window may not be enough for the model to construct an understanding of the patterns in the data. For example, in some example implementations windows sizes between 3 to 15 time steps may be used. Time steps and window size may be regarded as being equivalent to the number of previous samples or data points considered.

Further, in addition to being arranged as a stack of parallels cells, the neural network may be best multi-layered in the sense of having at least two layers of parallel units with the second or any further layers receiving the output of a previous layer as inputs in a form of vertical stacking.

Figure 2B:
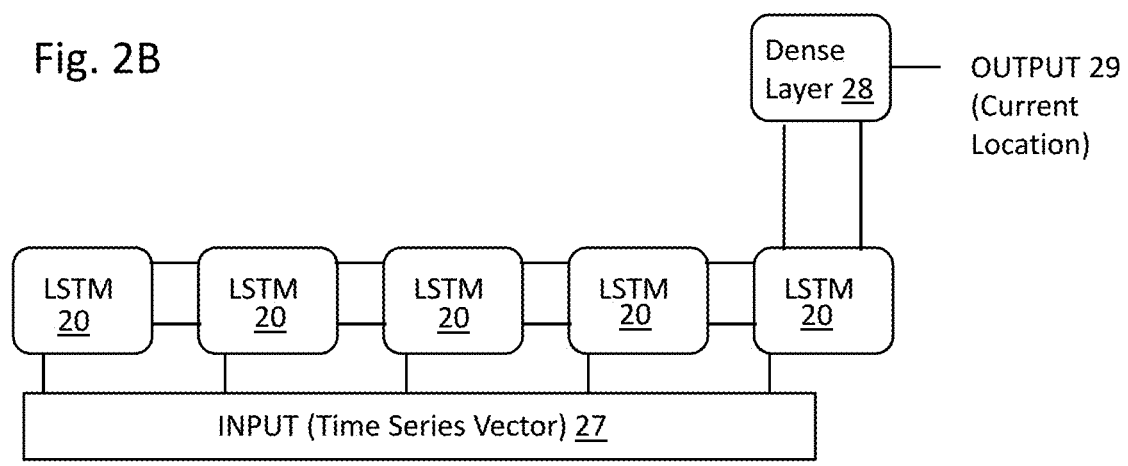

FIGS. 2A and 2B illustrate an example architecture of a multistage LSTM neural network, in accordance with the present disclosure. Shown in FIG. 2A is an example Long Short-Term Memory (LSTM) unit or cell 20, which may be used in models used to generates values representative of the location of mobile devices, in accordance with the present disclosure.

As shown in FIG. 2A, each LSTM unit or cell 20 may be composed as main elements of an input gate 21, a neuron with a self-recurrent connection (a connection from the neuron to itself) 22, a forget gate 23 and an output gate 24 and a memory input gate 25 and a memory output gate 26 allowing a transfer of memory states between cells.

The self-recurrent connection may be assigned a weight (e.g., has a weight of 1.0) which may be assigned to ensure that, barring any outside interference, the state of a memory cell may remain constant from one timestep to another. The gates serve to modulate the interactions between the memory cell itself and its environment. The input gate may allow incoming signal to alter the state of the memory cell or block it. On the other hand, the output gate may allow the state of the memory cell to have an effect on other neurons or prevent it. The forget gate may modulate the memory cell's self-recurrent connection, allowing the cell to remember or forget its previous state, as needed.

Shown in FIG. 2B is a multilayer LSTM model, comprising four layers of individual LSTM cells 20 as shown in FIG. 2A, with an input vector 27 (e.g., of five inputs comprising four previous time samples and one current) followed by a dense layer 28 to generate an output 29 of the estimated location. It should be noted that as is common in artificial intelligence (AI), representations the individual LSTM layer is representative of any number of layers—e.g., 4 layers in the example implementation shown in FIG. 2A. In some instances, further improvements may be gained by introducing dropout layers between LSTM layers. Another improvement may be gained by using bidirectional layers that look at the data in both directions, e.g., from the past to the current time step and vice versa. The level of performance may be further improved by a using a neural network model that may be bidirectional with one or more layers of attention cells.

In an attention cell, a measure of attention or weights may be calculated (during training and in operation) for each position, to indicate the importance of previous or (in a bidirectional network) of all other locations for the calculation of the present output location. Attention cells at a higher layer of the neural network may relate the attention measure(s) to hidden states, e.g., outputs of a previous layer of the network, instead of explicit locations. The attention measure may increase the accuracy of the location prediction by training the model for each location a location dependent measure of which other locations have the highest weight or relevance for the determination of the present location. Using bidirectionality in the neural even previously calculated locations may be corrected in the light of location of the same mobile device as determined later. When attention is calculated intrinsically based on a currently processed input, e.g., a sequence of inputs, it may be referred to as self-attention. The attention may also be multi-headed, e.g., calculated based on the same training set but using a plurality of different initial conditions or initial weights. The input may also be encoded using the position (or time) it has with respect to the sequence of inputs. This step is known as positional encoding or positional embedding.

In an example implementation, a "transformer" neural network model (e.g., as known in the field of natural language processing) may be used for the localization determination. The transformer may include an attention measure which is not dependent on recurrent processing referred to as "self-attention". In an example implementation, the self-attention may be determined for each position in the input sequence, such as by using three vectors K, Q and V created by multiplying the input vector by 3 weight matrices. These vectors represent an abstraction of the input called Key, Query and Value respectively. After a series of calculations, a score for each element in the sequence is assigned. This score represents how much a certain element is important in encoding another element. e.g., the attention. However, as an importance difference it should be noted that the standard attention in the LSTMs model outputs a matrix containing the importance of the input elements with respect to the optimization task at hand while the self-attention in the transformer computes also the weight of each input occurrence with respect to the other.

The self-attention computations may be extended to a multi-headed self-attention by training the model multiple times with different weight matrices and concatenating the outputs for each position and multiplying it by a trainable weight matrix. The self-attention or the multi-headed self-attention may improve the expressivity of the model by projecting the feature space multiple times and aggregating to encode a better representation of the input. This is especially important due to noisy signal measurements and the scarcity of features in the typical location determining problem.

In an example implementation, the transformer may be preceded with a positional embedding as described above giving each input a value representative of its position is a sequence or a vector of inputs.

Figure 3A:
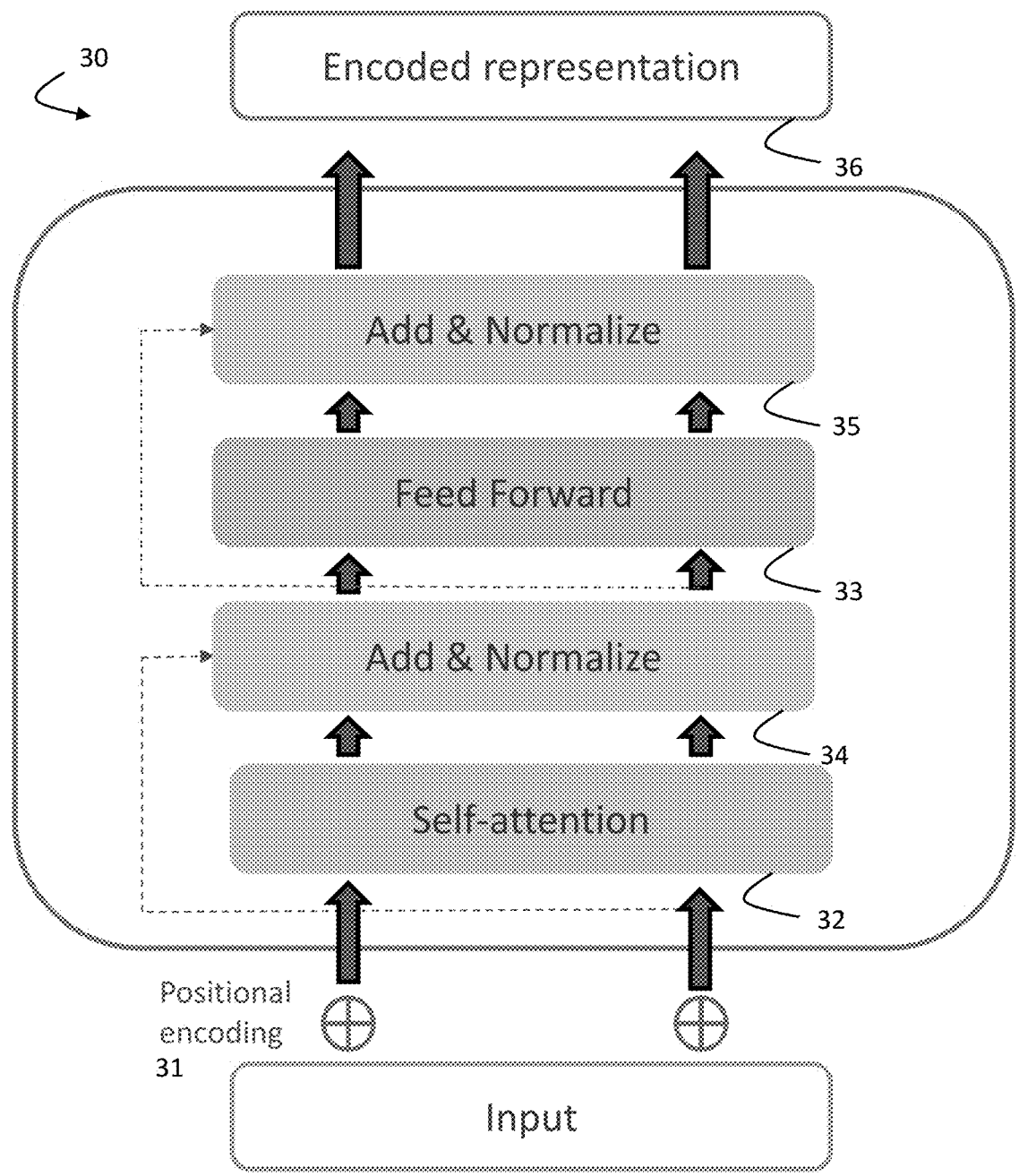
FIGS. 3A and 3B illustrate an encoder stage and a decoder stage of an example transformer, in accordance with the present disclosure.
Figure 3B:
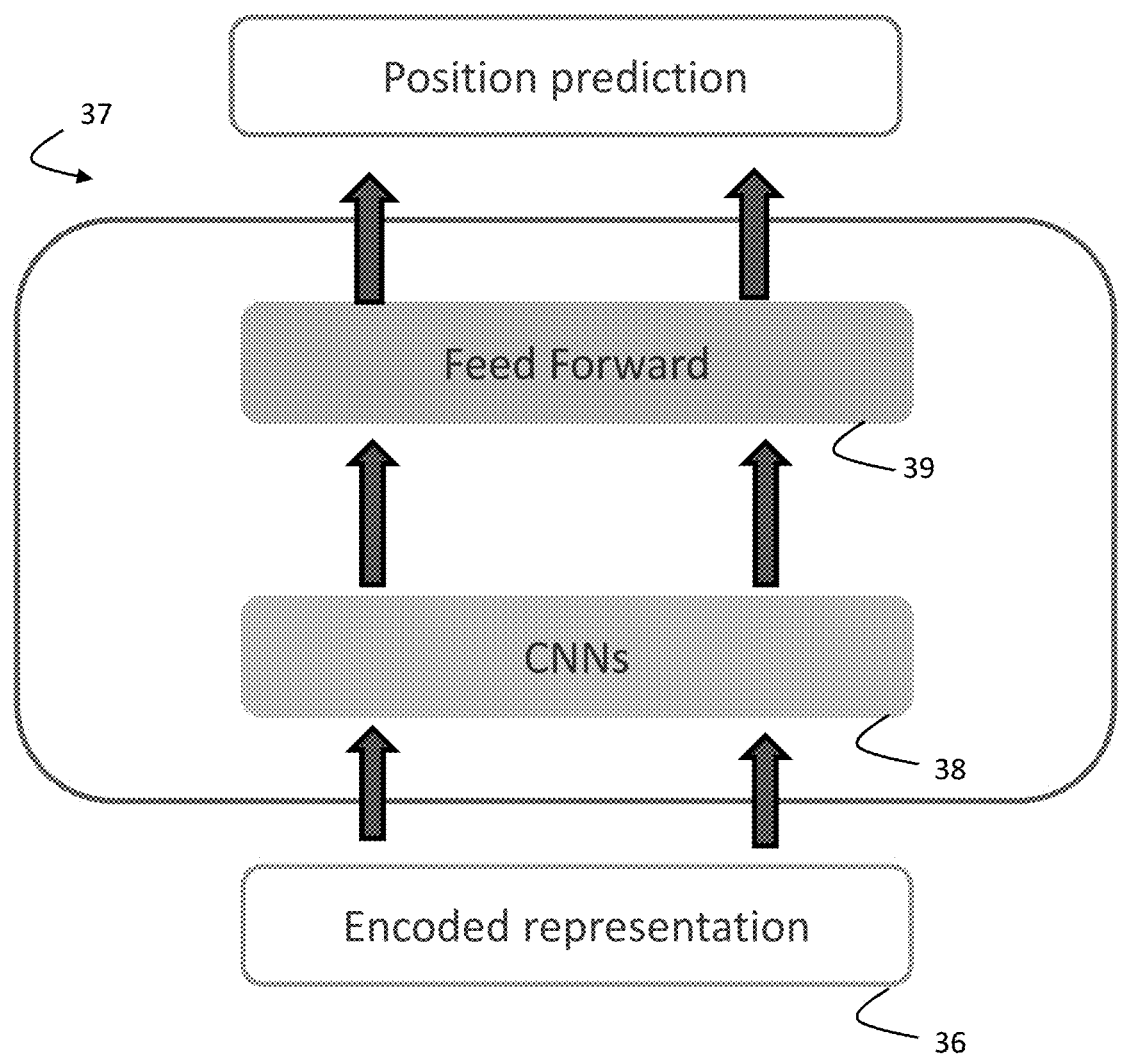

FIGS. 3A and 3B illustrate an encoder stage and a decoder stage of an example transformer, in accordance with the present disclosure. Shown in FIG. 3A is an encoder 30. In this regard, as shown in the example implementation illustrated in FIG. 3A, the encoder 30 comprises a positional embedding 31 feeding an input to a self-attention layer 32 and a feedforward layer 33. Each of these layers has a residual connection to a normalization layer 34, 35. The single layer encoder shown in FIG. 3A may be representative of a multi-layer stack of such encoders where the output of each encoder is passed as the input of the next one (without the positional embedding stage 31). The encoder 30 may be used to generate a (feature) representation 36 of the input using the self-attention mechanism(s), as described above.

Shown in FIG. 3B is a decoder 37. In this regard, a decoder or inference block corresponds to the second part of the model. As shown in the example implementation illustrated in FIG. 3B, in deviation from the standard transformer, as described above, the decoder 37 may comprise three convolutional neural networks (CNNs) 38 followed by two feedforwards layers 39. CNNs are thought of as automatic features extractors and since the features span over a 2D space composed of the time window and the generated feature representation 36 from the encoder (e.g., it is considered to fit well with the location problem). In a further change from the known transformer, the loss function to train the model is a mean square error loss function for regression.

The solutions described herein may significantly increase the accuracy of a location determination. Table 1 compares example results yielded by use of different methods for location determination:

TABLE 1 distance errors for different location determination methods

| Methods | Mean distance error [m] |
|---|---|
| Trilateration | 51.31 |
| Random Forest | 34.02 |
| Attention based LSTMs | 21.72 |
| Transformer | 17.45 |

In this regard, in Table 1 the first method used is triangulation (e.g., based on Friis law), which may relate signal strength ESP and distance to a receiver, such as using the formula:

$$d=a*\log(ESP)+b$$

where 'd' is distance to receiver, and 'a' and 'b' are fitting parameters for each receiver.

The triangulation method is not based on a trained model or AI related methods. The Random Forest method is a basic neural network method and the LSTM and transformer-based methods are described above. Thus, the neural network-based methods as described herein may be used to reduce the mean distance error to around 25 meters (or better if larger training data sets may be acquired). This is a significant improvement over known methods based solely on RSS related measurement and compares well with standard GPS data (e.g., about 5-10 m).

In some implementations, accuracy or uncertainty of generated outputs may also be improved. In this regard, in addition to improving the accuracy of the location determination, determining and improving the accuracy or uncertainty of the output generated may also be desirable, and may be of value to users. The results of trained neural networks are often treated as deterministic functions and generate the output without providing such a measure of uncertainty.

Accordingly, an important extension of the above described solutions may be adding a mechanism for determining an uncertainty measure. For example, such accuracy or uncertainty measure may be defined as fulfilling three performance conditions. In this regard, the uncertainty estimation may capture the confidence of the model in its own prediction; if the prediction is far away from the actual (ground-truth) value, then the uncertainty may increase. In addition, the uncertainty interval represents the spatial area where the model supposes the actual location exist; thus, any ground truth of the training set (e.g., GPS location data) may fall inside the boundaries of the interval. Further, the uncertainty interval may give the user a meaningful insight of the location, as a very wide interval reveals uselessness for any practical application; thus, an accuracy or uncertainty measure may be designed to minimize the interval width while respecting the two previous conditions.

The uncertainty may be generated through the use of a difference between the underlying ground truth used in training such as the GPS data and the location as generated by the model. The difference is typically used during the training of the model. However, when the model is applied at a later stage, e.g., when the method is operational, there is no further ground truth available. Thus, in various implementations, the uncertainty may be derived from the model itself, hence not relying on additional external measurements which may either not exist or be cumbersome to acquire and increase the cost of implementation of the proposed methods.

In an example implementation, the uncertainty may be derived by using dropout masks which set randomly inputs to various stages of neural network to zero during the training phase of the neural network. Dropouts as such are known to reduce the reliance of a neural network on certain inputs and have been employed to reduce the risk of "over-training" a neural network. However, it has been found that dropouts may be related to Bayesian probabilities linking input and output.

Based on this theoretical basis which links dropouts with uncertainty, the training of the model may be regarded as a two-stage process including an initial training of the model based on a first set of (training) data and a second phase which may be regarded as test phase. The latter test phase uses a second (test) data set which itself has not been used during the initial training phase to test the stability of the predictions, e.g., the uncertainty, of the trained model.

The uncertainty of a prediction is determined by using a set of different dropout conditions ("dropout masks") with each set setting for example different probabilities for dropouts. The dropouts may be applied in horizontal or in vertical direction. However, to better correspond to probabilities, dropout masks may be used, which generate both vertical and horizontal dropouts. The use of a multitude of dropout conditions may be regarded as Monte Carlo testing of the model.

Whereas in the more common interpretation of dropouts random nodes are removed with a probability p at each training step, in the Bayesian interpretation, at each training step the posterior distribution of the weights is updated and in test time the posterior is used to determine the predictive distribution. In terms of implementation, the dropouts uncertainty estimation sums up to performing standard and recurrent dropouts across the layers at test time and run multiple times in a Monte Carlo fashion. This yields a distribution composed of the different posteriori approximations that represents a confidence interval of the model.

There may be different ways for extracting the uncertainty from the distribution—e.g., it may be possible to use the maximum and the minimum as boundaries. However, this approach is prone to having large intervals due to outliers. In an example implementation, the mean and the standard deviation may be calculated, and depending on the required confidence, the intervals may be defined as a multiple of the standard deviation of the distribution centered at the mean.

Figure 4A:
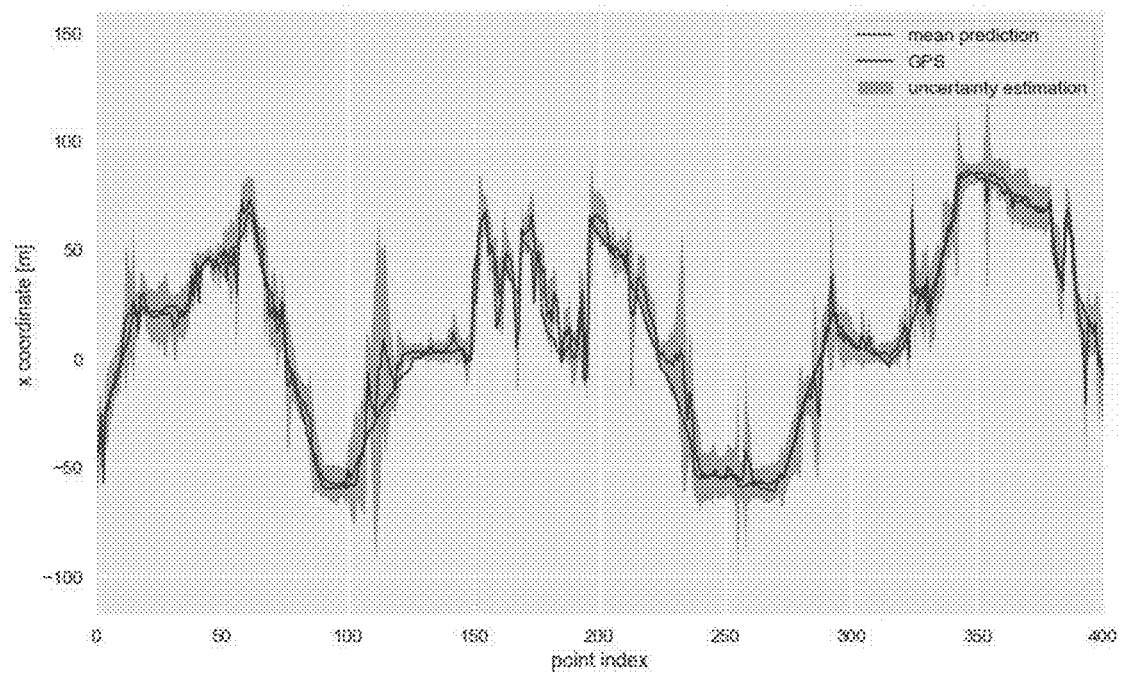
FIGS. 4A and 4B illustrate examples of the location dependent uncertainty for coordinates of a location of a mobile device, in accordance with the present disclosure.
Figure 4B:
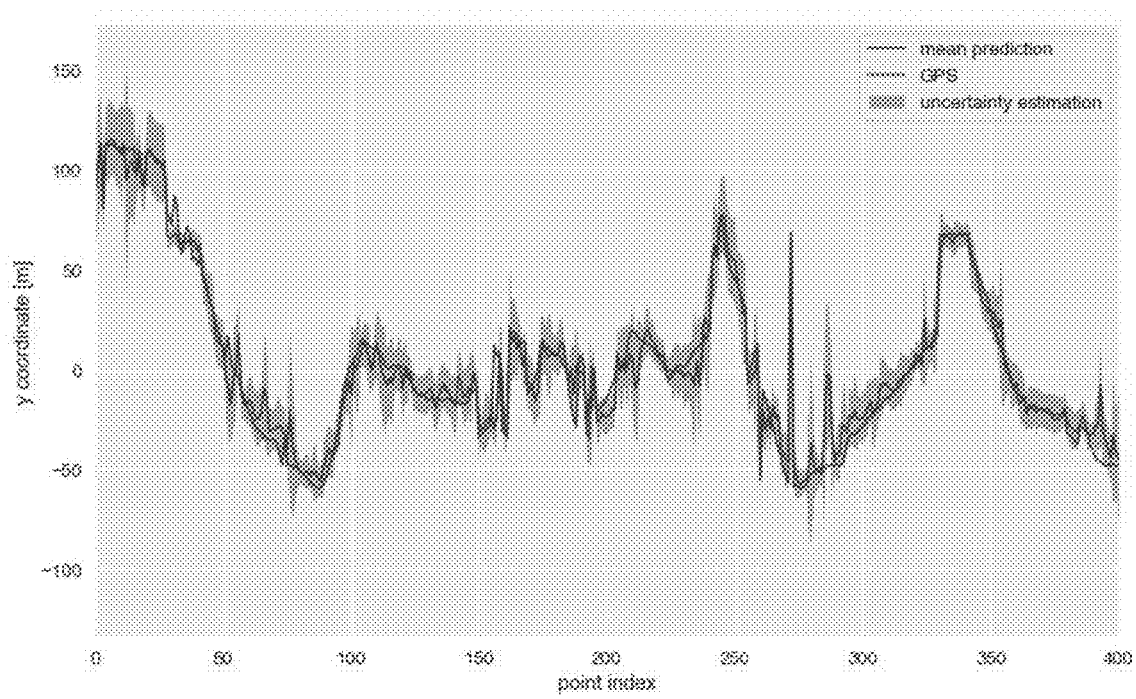

FIGS. 4A and 4B illustrate examples of the location dependent uncertainty for coordinates of a location of a mobile device, in accordance with the present disclosure. Shown in FIGS. 4A and 4B are charts illustrating dependent uncertainty measurements for x- and y-coordinates. In this regard, the uncertainty is represented by the areas below and above a solid curve indicating the mean value for the respective coordinate/position. A second solid curve represents the position as per GPS (ground truth).

Figure 5:
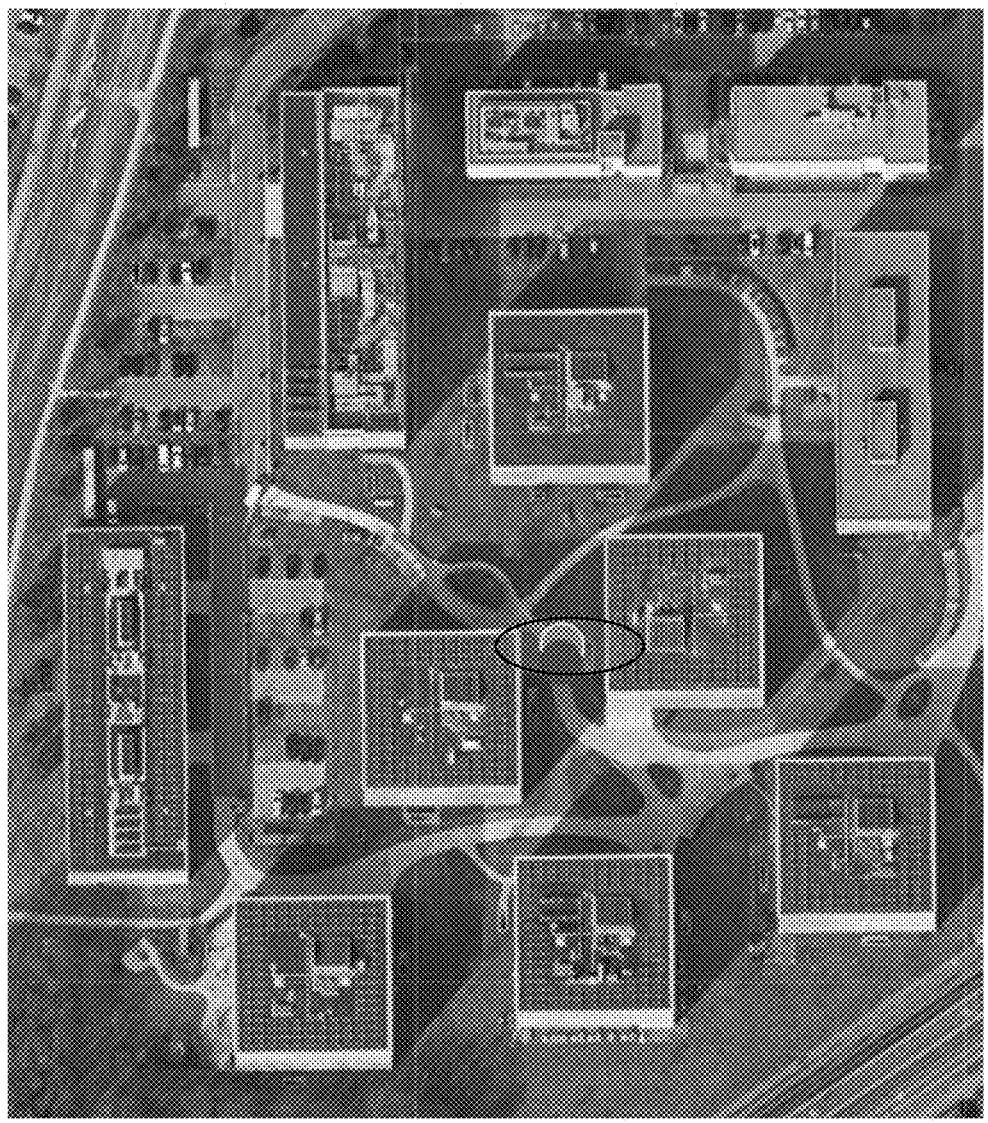
FIG. 5 illustrates a determined location and its uncertainty overlaid over a geographical map of LoRaWAN area/campus, in accordance with the present disclosure.

FIG. 5 illustrates a determined location and its uncertainty overlaid over a geographical map of LoRaWAN area/campus, in accordance with the present disclosure. Shown in FIG. 5 is an example use scenario, based on the location dependent uncertainty data illustrated in the charts of FIGS. 4A and 4B. In this regard, as illustrated in FIG. 5, when overlaying the results of the location dependent uncertainty determination over a map the positions as shown in FIG. 5, the GPS and the determined mean location are shown as circles with the uncertainty represented as ellipse forming the envelop around the uncertainties as determined for that position by the model.

In various example implementations, the functions and operations associated with solutions in accordance with the present disclosure may be implemented in digital electronic circuitry, in tangibly-embodied computer software or firmware, in computer hardware, comprising the disclosed structures and their structural equivalents, and in combinations thereof. In some example implementations, suitable systems, comprising suitable circuitry, may be used and configured for implementing at least some aspects of the present disclosure—e.g., in performing at least some of the functions and operations associated with solutions in accordance with the present disclosure.

In an example implementation, a data processing apparatus may be used. In this regard, as used herein the data processing apparatus may comprise various elements configured to perform various functions in accordance with the present disclosure. Each of the elements of the data processing apparatus may comprise suitable circuitry for implementing various aspects of the present disclosure. Such circuitry may comprise, for example, general or dedicated processing circuitry, storage circuitry, communication-related circuitry, etc. In some instances, data processing apparatus may be implemented as a single physical apparatus, which may reside at a particular location within a network. In other instances, however, the various steps and/or related operations may be performed by various different components and/or subsystems of the network. In this regard, the different components and/or subsystems may interact with each other, and data or control services may be performed or handled either in a centralized way, or may have their functionalities distributed among the different subsystems, for example leveraging the cooperation between the different subsystems.

The term "data processing apparatus" as used in the present disclosure may encompass all kinds of apparatus, devices, and machines for processing data, comprising by way of example a programmable processor, a computer, or multiple processors or computers. The apparatus may comprise special purpose logic circuitry, e.g., an FPGA (field programmable gate array) or an ASIC (application specific integrated circuit). The apparatus may also comprise, in addition to hardware, code that creates an execution environment for the computer program in question, e.g., code that constitutes processor firmware, a protocol stack, a database management system, an operating system, or a combination of one or more of them.

In some example implementations, one or more computer programs, e.g., one or more modules of computer program instructions encoded on a tangible non-transitory program carrier for execution by, or to control the operation of, a suitable system (e.g., the data processing apparatus) may be used. Alternatively, or in addition, the program instructions may be encoded on an artificially generated propagated signal, e.g., a machine-generated electrical, optical, or electromagnetic signal, which may be generated to encode information for transmission to suitable receiver apparatus for execution by a data processing apparatus. The computer storage medium may be a machine-readable storage device, a machine-readable storage substrate, a random or serial access memory device, or a combination of one or more of them.

A computer program (which may also be referred to or described as a program, software, a software application, a module, a software module, a script, or code) may be written in any form of programming language, comprising compiled or interpreted languages, or declarative or procedural languages, and it may be deployed in any form, comprising as a stand-alone program or as a module, component, subroutine, or other unit suitable for use in a computing environment. A computer program may, but need not, correspond to a file in a file system. A program may be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program may be deployed to be executed on one computer or on multiple computers that are located at one site or distributed across multiple sites and interconnected by a communication network.

In various example implementations, the processes and logic flows described in this disclosure may be performed by one or more programmable computers executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Computers suitable for the execution of a computer program comprise, by way of example, may be based on general or special purpose microprocessors or both, or any other kind of central processing unit. Generally, a central processing unit may receive instructions and data from a read only memory or a random access memory or both. The essential elements of a computer are a central processing unit for performing or executing instructions and one or more memory devices for storing instructions and data. Generally, a computer may also comprise, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data comprise all forms of non-volatile memory, media and memory devices, comprising by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

In various example implementations, to provide for interaction with a user, systems used in conjunction with the present disclosure may comprise suitable input and/or output components. For example, a computer having a display device for displaying information to the user and a keyboard and a pointing device, e.g., a mouse or a trackball, by which the user may provide input to the computer, may be used. Other kinds of devices may be used to provide for interaction with a user as well; for example, feedback provided to the user may be any form of sensory feedback, e.g., visual feedback, auditory feedback, or tactile feedback; and input from the user may be received in any form, comprising acoustic, speech, or tactile input. In addition, a computer may interact with a user by sending documents to and receiving documents from a device that is used by the user; for example, by sending web pages to a web browser on a user's client device in response to requests received from the web browser.

In various example implementations, a computing system that comprises a back end component (e.g., as a data server), a computing system that comprises a middleware component (e.g., an application server), a computing system that comprises a front end component (e.g., a client computer having a graphical user interface or a Web browser through which a user may interact), or a computing system comprising any combination of such components may be used. The components of the system may be interconnected by any form or medium of digital data communication, e.g., a communication network. Examples of communication networks comprise a local area network ("LAN") and a wide area network ("WAN"), e.g., the Internet.

In some example implementations, computing system may comprise clients and servers. A client and server are generally remote from each other and typically interact through a communication network. The relationship of client and server arises by virtue of computer programs running on the respective computers and having a client-server relationship to each other.

While this disclosure provides many specific implementation details, these should not be construed as limitations on the scope of disclosure, but rather as descriptions of features that may be specific to particular implementations of particular inventions. Certain features that are described in this disclosure in the context of separate implementations may also be implemented in combination in a single implementation. Conversely, various features that are described in the context of a single implementation may also be implemented in multiple implementations separately or in any suitable sub-combination. Further, although features may be described above as acting in certain combinations, one or more features from a particular combination may in some cases be excised from the combination, and the combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems may generally be integrated together in a single software product or packaged into multiple software products.

While certain sequence of actions may have been described with respect to some example implementations, the disclosure need not be limited to the exact sequence as describes, and such. For example, actions may be performed in a different order while still achieving desirable results. As one example, the processes depicted in the accompanying figures do not necessarily require the particular order shown, or sequential order, to achieve desirable results. In certain implementations, multitasking and parallel processing may be advantageous.

It should be appreciated from the discussion above that the embodiments shown in the figures are merely exemplary, and include features that may be generalized, removed or replaced as described herein and as set out in the claims. With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments, the function of one or more elements shown in the drawings may be integrated into a single functional unit.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present disclosure may be realized in hardware, software, or a combination of hardware and software. The present disclosure may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure makes reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present disclosure not be limited to the particular embodiment disclosed, but that the present disclosure will include all embodiments falling within the scope of the appended claims.

What is claimed is:

1. A method of determining a location of a mobile device communicating with a long-range low-power wide-area network (LoRaWAN), the method comprising:
    collecting, while the mobile device is moving within a reception area of the long-range low-power wide-area network (LoRaWAN), signals transmitted between the mobile device and one or more gateways of the long-range low-power wide-area network (LoRaWAN) that have known locations; and
    evaluating the signals, using a model that is configured to accept input values relating to a signal strength measure (RSS) of electromagnetic signals, wherein the evaluating comprises:
        deriving for each signal of the signals, values representative of signal strength measure of the signal; and
        applying the values as input signals into the model;
    generating using the model, adjustment values based on an attention measure, a self-attention, and/or other input signals representative of locations; and
    adjusting using the model, the values representative of location of the mobile device based on the adjustment values.

2. The method of claim 1, wherein the model is configured to determine the influence of prior input values or prior locations during generation of a current values representative of the location of the mobile device.

3. The method of claim 1, wherein the model comprises a trained neural network model having a sequential encoder and decoder stage.

4. The method of claim 3, wherein the encoder comprises a recurrent neural network (RNN), long short-term memory (LSTM), or an encoder stage of a transformer.

5. The method of claim 1, comprising treating location values in the model as continuous.

6. The method of claim 1, comprising using a temporal sequence of a plurality of subsequent input signals as a simultaneous input to the model, and wherein an input layer of the model comprises a plurality of parallel units configured for receiving the temporal sequence.

7. The method of claim 1, wherein the model comprises self-attention elements configured for determining weights representative of importance of other locations or other input signals representative of locations to generated values representative of actual location.

8. The method of claim 7, comprising using output of the self-attention elements as input into a decoder stage of the model.

9. The method of claim 1, wherein the model is configured for encoding the input signals based on positions within a temporal sequence of input signals.

10. The method of claim 1, wherein signals are transmitted signals between the mobile device and the one or more gateways continuously or intermittently.

11. A system of determining a location of a mobile device communicating with a long-range low-power wide-area network (LoRaWAN), the system comprising:
    one or more circuits configured to:
        collect, while the mobile device is moving within a reception area of the long-range low-power wide-area network (LoRaWAN), signals transmitted between the mobile device and one or more gateways of the long-range low-power wide-area network (LoRaWAN) that have known locations; and
        evaluate the signals, using a model that is configured to accept input values relating to a signal strength measure (RSS) of electromagnetic signals, the evaluating comprising:
            deriving for each signal of the signals, values representative of signal strength measure of the signal; and
            applying the values as input signals into the model;
        generate using the model, adjustment values based on an attention measure, a self-attention, and/or other input signals representative of locations; and
        adjust using the model, the values representative of location of the mobile device based on the adjustment values.

12. The system of claim 11, wherein the one or more circuits are configured to, using the model, determine the influence of prior input values or prior locations during generation of a current values representative of the location of the mobile device.

13. The system of claim 11, wherein the model comprises a trained neural network model having a sequential encoder and decoder stage.

14. The system of claim 13, wherein the encoder comprises a recurrent neural network (RNN), long short-term memory (LSTM), or an encoder stage of a transformer.

15. The system of claim 11, wherein the one or more circuits are configured to use a temporal sequence of a plurality of subsequent input signals as a simultaneous input to the model, and wherein an input layer of the model comprises a plurality of parallel units configured for receiving the temporal sequence.

16. The system of claim 11, wherein the model comprises self-attention elements configured for determining weights representative of importance of other locations or other input signals representative of locations to generated values representative of actual location.

17. The system of claim 11, wherein the model is configured for encoding the input signals based on positions within a temporal sequence of input signals.

18. The system of claim 11, wherein signals are transmitted signals between the mobile device and the one or more gateways continuously or intermittently.

* * * * *